Dec. 2, 1941.  C. J. PETERSON  2,264,332
BELT CONVEYER
Filed July 31, 1939  2 Sheets-Sheet 1
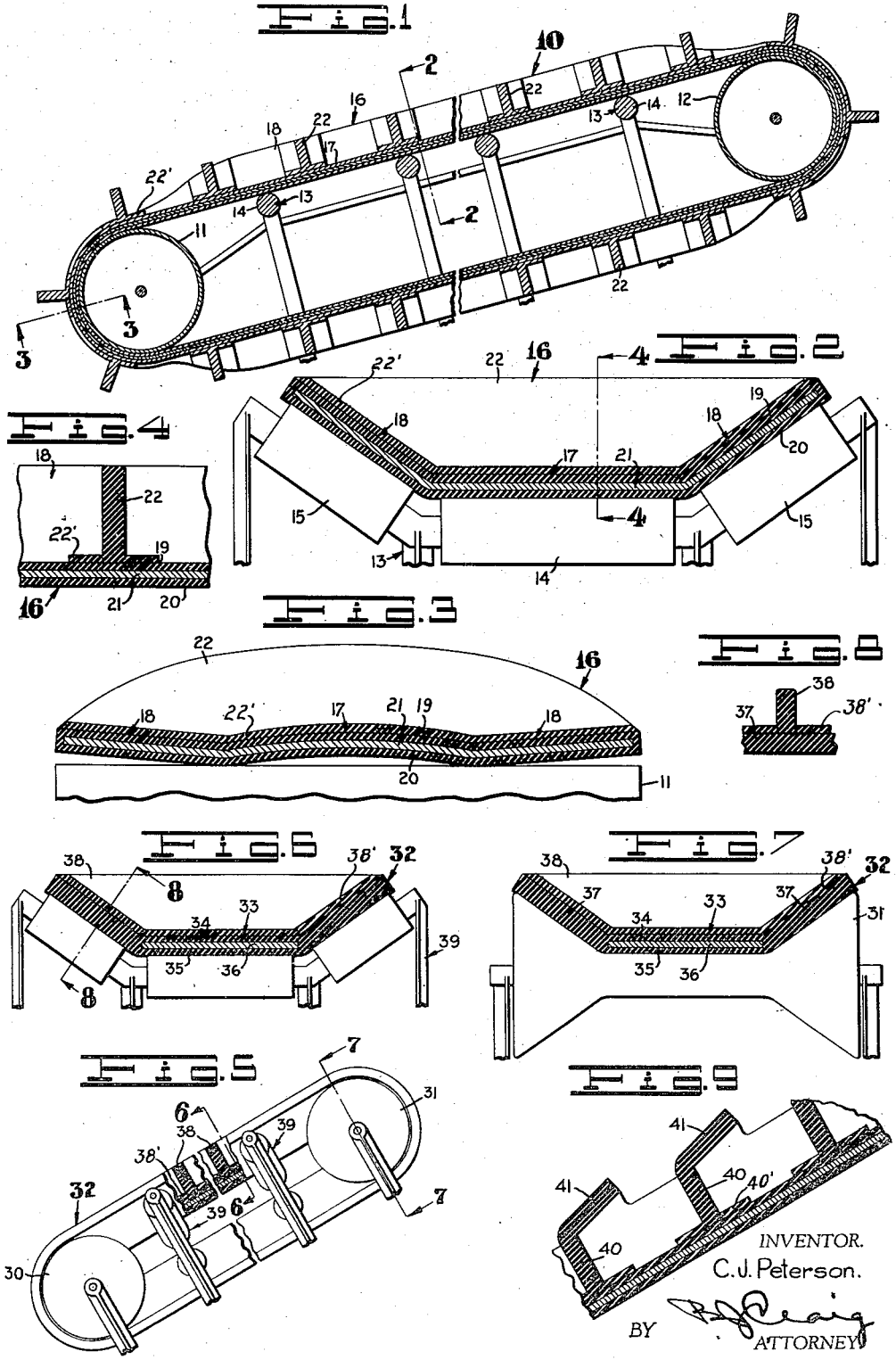
INVENTOR.
C. J. Peterson.
BY
ATTORNEY Dec. 2, 1941. C. J. PETERSON 2,264,332
BELT CONVEYER
Filed July 31, 1939 2 Sheets-Sheet 2
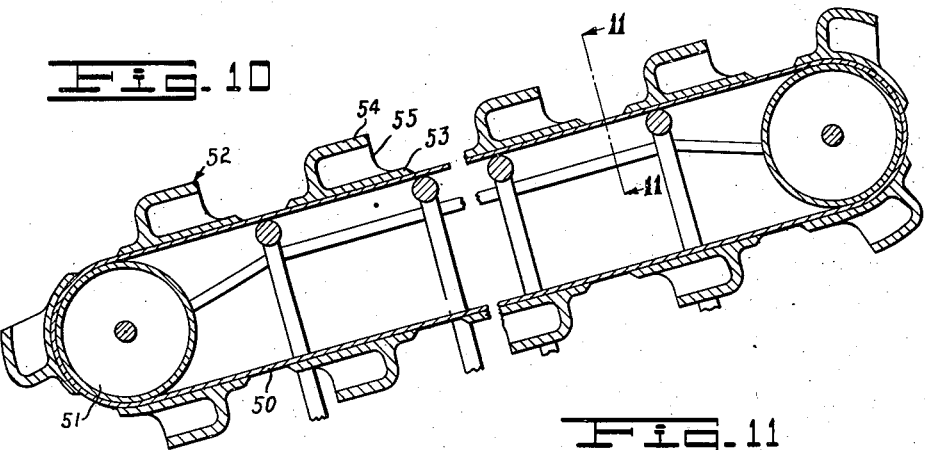
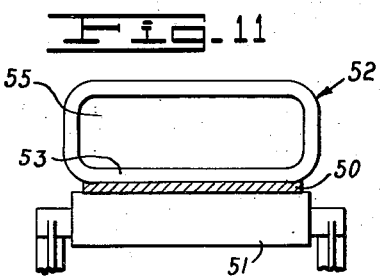
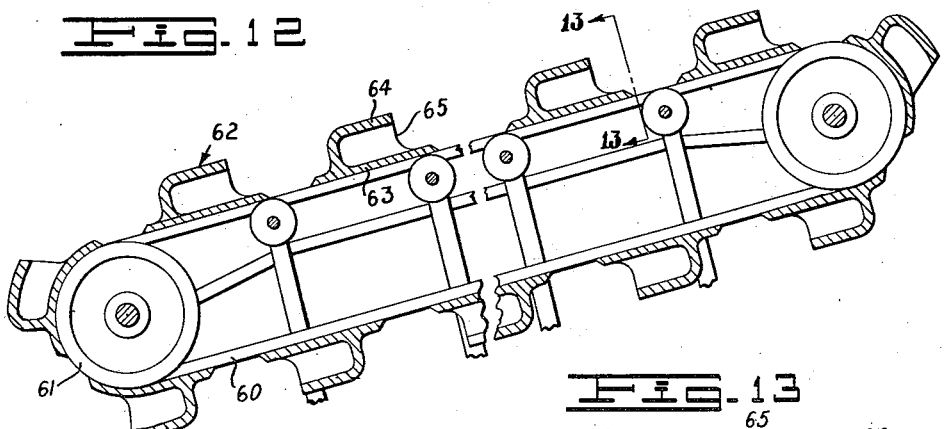
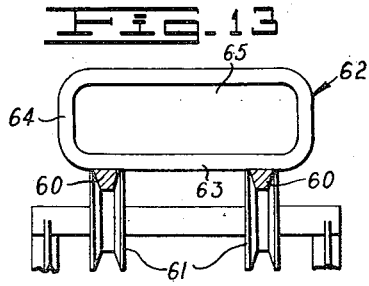
INVENTOR.
C. J. Peterson
BY
ATTORNEY.

Patented Dec. 2, 1941

2,264,332

UNITED STATES PATENT OFFICE 2,264,332

BELT CONVEYER

Clarence J. Peterson, Bakersfield, Calif.

Application July 31, 1939, Serial No. 287,495

3 Claims. (Cl. 198—199)

This invention relates to belt conveyers.

The general object of the invention is to provide an improved belt conveyer which includes integral, transversely extending, partition members.

Another object of the invention is to provide a belt conveyer including elastic, transversely extending, partition members which form pockets and which are so arranged that the belt may pass over a cylindrical pulley.

Another object of the invention is to provide a belt conveyer including a base portion and transversely extending partitions and wherein the sides of the belt include elastic portions enabling the belt to pass over a spool pulley.

Another object of the invention is to provide a belt conveyer including elastic partition forming transversely extending spaced members.

Another object of the invention is to provide a belt conveyer including parallel V-belts having pocket members therein.

Other objects and the advantages of this invention will be apparent from the following description taken in connection with the accompanying drawings, wherein:

Fig. 1 is a central sectional view through a conveyer showing my invention;

Fig. 2 is a section taken on line 2—2, Fig. 1;

Fig. 3 is a fragmentary section taken on line 3—3, Fig. 1;

Fig. 4 is a fragmentary section taken on line 4—4, Fig. 2;

Fig. 5 is a view similar to Fig. 1 showing a modification;

Fig. 6 is a fragmentary section taken on line 6—6, Fig. 5;

Fig. 7 is a fragmentary section taken on line 7—7, Fig. 5;

Fig. 8 is a fragmentary section taken on line 8—8, Fig. 6;

Fig. 9 is a fragmentary sectional view showing a further modification;

Fig. 10 is a view similar to Fig. 1 showing a modification;

Fig. 11 is a section taken on line 11—11, Fig. 10;

Fig. 12 is a view similar to Fig. 1 showing a further modification; and

Fig. 13 is a section taken on line 13—13, Fig. 12.

Referring to the drawings by reference characters I have shown my invention as embodied in a conveyer which is indicated generally at 10. As shown the conveyer includes end cylindrical pulley members 11 and 12 which are supported on suitable shafts and between these pulley members are mounted additional supporting pulley assemblies 13. Each supporting pulley assembly as shown includes an intermediate cylindrical pulley 14 and inclined edge pulleys 15 to form a trough shaped support.

The conveyer belt 16 includes a central portion 17 and edge side portions 18 which are normally inclined to the central portion to thereby form a trough shaped conveyer. The central portion engages the pulleys 14 and the inclined portions engage the pulleys 15 when the belt is operating.

The portions 17 and 18 as shown include upper and lower rubber faces 19 and 20 and an intermediate reinforcing canvas member 21.

The belt is provided at spaced intervals with a plurality of transversely arranged elastic partitions 22 which are made of rubber or similar material and are of such character that they may be stretched. The partitions 22 as shown each includes a base 22' which is preferably vulcanized in place.

In use the belt is installed as shown in Fig. 1 and is driven in any desired manner. Material is placed in the pockets adjacent each partition 22 and is thus conveyed by engagement with the partitions. As the portions of the belt pass over the end pulleys 11 and 12, the sides 18 are flattened as shown in Fig. 3.

This action causes a stretching on the elastic partitions 22 which assume in general the shape shown in Fig. 3 as they pass over the pulleys 11 and 12. As soon as the sides 18 pass the pulleys they assume their normal position and shape.

Figs. 5 to 8, inclusive, illustrate a modification of my invention wherein the end pulleys 30 and 31 are spool shaped and are engaged by a belt 32. This belt 32 is trough shaped and as shown the intermediate flat portion 33 includes upper and lower layers of rubber 34 and 35 with an intermediate layer 36 of fabric. The side portions 37 of the belt are made entirely of elastic material so that they may stretch.

The belt is provided with transverse partitions 38 which are shown as made of elastic material. The partitions 38 are shown as provided with bases 38' vulcanized to the belt.

In operation the belt 32 as it advances engages the spools 30 and 31 and the intermediate portion of the belt 35 passes over the central portion of the pulley without stretching while the sides 37 of the belt are stretched as they pass over the pulleys and then resume their normal shape after the pulleys are left. The spool pulleys 30 and 31 are preferably shaped so that the partition forming portions 38 of the belt are not stretched during their passage over the pulleys.

In Fig. 9 I show a modification of my invention wherein partitions 40 having bases 40' and similar to the partitions 22 and 38 are provided and wherein these partitions include lips 41 which engage the adjacent side portions of the belt to form pockets. These pockets preferably are closed at their bottom, front, rear and at both sides and have an open upper portion and thus serve to convey larger quantities of material or carry the material on steeper inclines than is provided for by the belt without the overhanging lips.

In Figs. 10 and 11 I show a modification of my invention wherein the belt 50 includes a flat portion which is mounted on pulleys 51. At spaced intervals along the belt I provide a plurality of pocket members 52. Each of these members includes a base 53 preferably vulcanized to the belt 50 and a pocket portion 54 which includes an open top 55.

In Figs. 12 and 13 I show another modification wherein the conveyer includes a plurality of spaced V-belts 60 which are mounted on V pulleys 61. Arranged on the V-belts 60 I show pocket forming members 62 each of which includes a base 63 which straddles the V-belt 60 extending from one to the other and is vulcanized thereto. Each of the pocket members also includes a pocket portion 64 having an open top 65.

In the construction shown in Figs. 10 to 13, inclusive, it will be understood that the belts may be made of suitable flexible material such as canvas or canvas and rubber and that the pockets may likewise be made of suitable flexible material which can be secured to the belt members. The operation of the last two mentioned modifications is similar to that of the types previously described.

Having thus described my invention, I claim:

1. A conveyer belt of trough shape and including a bottom and sides which are continuous, said sides being inclined relative to the bottom, and a plurality of spaced partitions on the belt, each of said partitions being made of elastic material and secured to the bottom and to the sides of the belt, said partition being normally unstretched when the belt is in trough shape and normally holding the sides of the belt in trough forming position relative to the bottom, said partitions being adapted to stretch to permit the sides of the belt to move downwardly when the belt passes over a cylindrical pulley, and being adapted to restore the belt to trough forming position after the belt has passed beyond the cylindrical pulley.

2. In a conveyer, a pair of spaced pulleys and an endless belt passing over said pulleys, said belt being of trough shape and including a bottom and sides which are of integral construction, said sides being inclined relative to the bottom, said belt being made of non-stretchable material throughout, and a plurality of spaced partitions on the belt, each of said partitions being made of elastic material and each including a portion vulcanized to the bottom and to the sides of the belt, said partition being normally unstretched when the belt is in trough shape and normally holding the sides of the belt in trough forming position relative to the bottom, said partitions being adapted to stretch to permit the sides of the belt to move downwardly when the belt passes over a cylindrical pulley, and being adapted to restore the belt to trough forming position after the belt has passed beyond the cylindrical pulley.

3. In a conveyer, a pair of spaced pulleys and an endless belt passing over said pulleys, said belt being of trough shape and including a bottom and sides which are of integral construction, said sides being inclined relative to the bottom, the bottom and sides of said belt being made of non-stretchable material, and a plurality of spaced partitions on the belt, each of said partitions being made of elastic material and each including an upstanding portion having an integral base which extends throughout the length of the partition and which is vulcanized to the bottom and to the sides of the belt, said partitions being normally unstretched when the belt is in trough shape and normally holding the sides of the belt in trough forming position relative to the bottom, said partitions being adapted to stretch to permit the sides of the belt to flex downwardly when the belt passes over a cylindrical pulley, and being adapted to restore the belt to trough forming position after the belt has passed beyond the cylindrical pulley.

CLARENCE J. PETERSON.